(12) United States Patent
Kim

(10) Patent No.: US 6,205,004 B1
(45) Date of Patent: Mar. 20, 2001

(54) DEVICE FOR FIXING ACTUATOR AND COVER IN HARD DISK DRIVE

(75) Inventor: Myung-Il Kim, Kumi (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/263,806

(22) Filed: Mar. 8, 1999

(30) Foreign Application Priority Data

Mar. 9, 1998 (KR) .................................... 98-7679

(51) Int. Cl.$^7$ ........................................ G11B 5/55
(52) U.S. Cl. .................... 360/264.1; 360/97.01; 360/265.6
(58) Field of Search ............... 360/97.01, 98.01, 360/106, 265.2, 265.3, 265.4, 265.5, 265.6, 264.1, 264.3

(56) References Cited

U.S. PATENT DOCUMENTS

| | | | |
|---|---|---|---|
| 4,945,435 | * 7/1990 | Boigenzahn et al. | 360/106 |
| 5,216,662 | * 6/1993 | Stefansky et al. | 360/105 |
| 5,270,887 | 12/1993 | Edwards et al. | 360/97.03 |
| 5,568,341 | 10/1996 | Shikano | 360/97.02 |
| 5,583,721 | * 12/1996 | Kim | 360/97.01 |
| 5,754,372 | * 5/1998 | Ramsdell et al. | 360/106 |
| 5,864,441 | * 1/1999 | Coffey et al. | 360/97.01 |

* cited by examiner

*Primary Examiner*—Jefferson Evans
(74) *Attorney, Agent, or Firm*—Robert E. Bushnell, Esq.

(57) ABSTRACT

A device for fixing an actuator and a cover in a hard disk drive is provided with a body base having a boss and a screw hole formed on the boss. A pivot bearing is formed at the center of the actuator and fit around the boss, a cylindrical ring of a predetermined length is closely inserted into the pivot bearing, a hole is formed on the cover, and a pivot screw is tightened into the screw hole of the boss through the hole of the cover and the cylindrical ring. Therefore, the actuator and the cover are simultaneously fixed on the base body by the pivot screw.

20 Claims, 5 Drawing Sheets

US 6,205,004 B1

DEVICE FOR FIXING ACTUATOR AND COVER IN HARD DISK DRIVE

CLAIM OF PRIORITY

This application makes reference to, incorporates the same herein, and claims all benefits accruing under 35 U.S.C. §119 from an application entitled Device for Fixing Actuator and Cover in Hard Disk Drive earlier filed in the Korean Industrial Property Office on Mar. 9, 1998, and there duly assigned Serial No. 98-7679 by that Office.

BACKGROUND OF THE INVENTION

1. Field of the Invention

The present invention relates to a hard disk drive (HDD), and more particularly to an actuator and cover fixing device in the HDD, which concurrently assembles the actuator and the cover on a body base of the HDD by a single pivot screw.

2. Description of the Related Art

Fixing devices have been used in past for fixing a cover and a base in HDD and pivotally fixing an actuator assembly on the base. Typically, fixing devices fix the cover and the base by screws or fixedly mount the actuator assembly on the base by screws. With these conventional fixing devices, assembling processes are very complicated and fixing devices are not suitable for precision and dust free purposes. I have therefore found that it is impossible to correct or otherwise improve the conventional process in order to get a more convenient and precise fixing device.

U.S. Pat. No. 5,270,887 for A Compact Disk Drive Head Disk Assembly With Conformable Tape Seal issued to Edwards et al., discloses an assembly having a cover and a base. The cover is mounted to the base through screws engaging matching thread openings in the base. One of the screws is connected to a engaging matching threaded opening of a post of the base. The actuator assembly is mounted on the base through the post matching cylindrical opening in the actuator. The post has an inner post rigidly mounted to the base and an outer sleeve freely rotatably coupled to inner post through a ball bearing and race assembly. I have noticed that this assembly has several defects that the actuator and post can not be assembled precisely and perfectly.

U.S. Pat. No. 5,568,341 for a Magnetic Disk Drive Sealing Structure Having A Soft Elastic Member Bonded to A Core Member issued to Shikano, discloses a magnetic disk drive sealing structure with an actuator assembly rotatably mounted on a pivot shaft and a cover firmly secured to the base housing by screws. This reference uses a pivot shaft and two screws to secure both the cover and the base; therefore, this structure is very inconvenient and more complicated to assemble.

SUMMARY OF THE INVENTION

It is an object of the present invention to provide a device for simultaneously assembling an actuator and a cover on a body base with a single pivot screw in an HDD.

It is another object of the present invention to provide a device for simultaneously assembling an actuator and a cover on a body base with a single pivot screw having a cross screw driver recess on the head thereof in an HDD in order to protect a head and a disk against a shock and prevent assembly failures when the pivot screw is inserted.

It is an yet another object of the present invention to provide a single pivot screw having a cylindrical portion preventing from breakage even at an excess torque when the pivot screw is inserted.

It is still another object to provide a single pivot screw having a screw thread portion to be inserted into a screw hole of a boss formed on the base.

It is still yet another object to provide a fixing device with a cylindrical ring receiving the cylindrical portion of the single pivot screw.

It is also an object to provide a fixing device with a pivot bearing having an outer sleeve received by an opening of the actuator assembly and an inner sleeve fit around both the boss and the cylindrical ring to mount the actuator assembly pivotally on the boss of the base.

It is further object to provide a fixing hole formed in a cover receiving the single pivot screw.

It is further another object to provide a pivot screw tightening into the screws hole of the boss through the fixing hole of the cover and the cylindrical ring to fix the actuator and the cover simultaneously on the base by the pivot screw.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
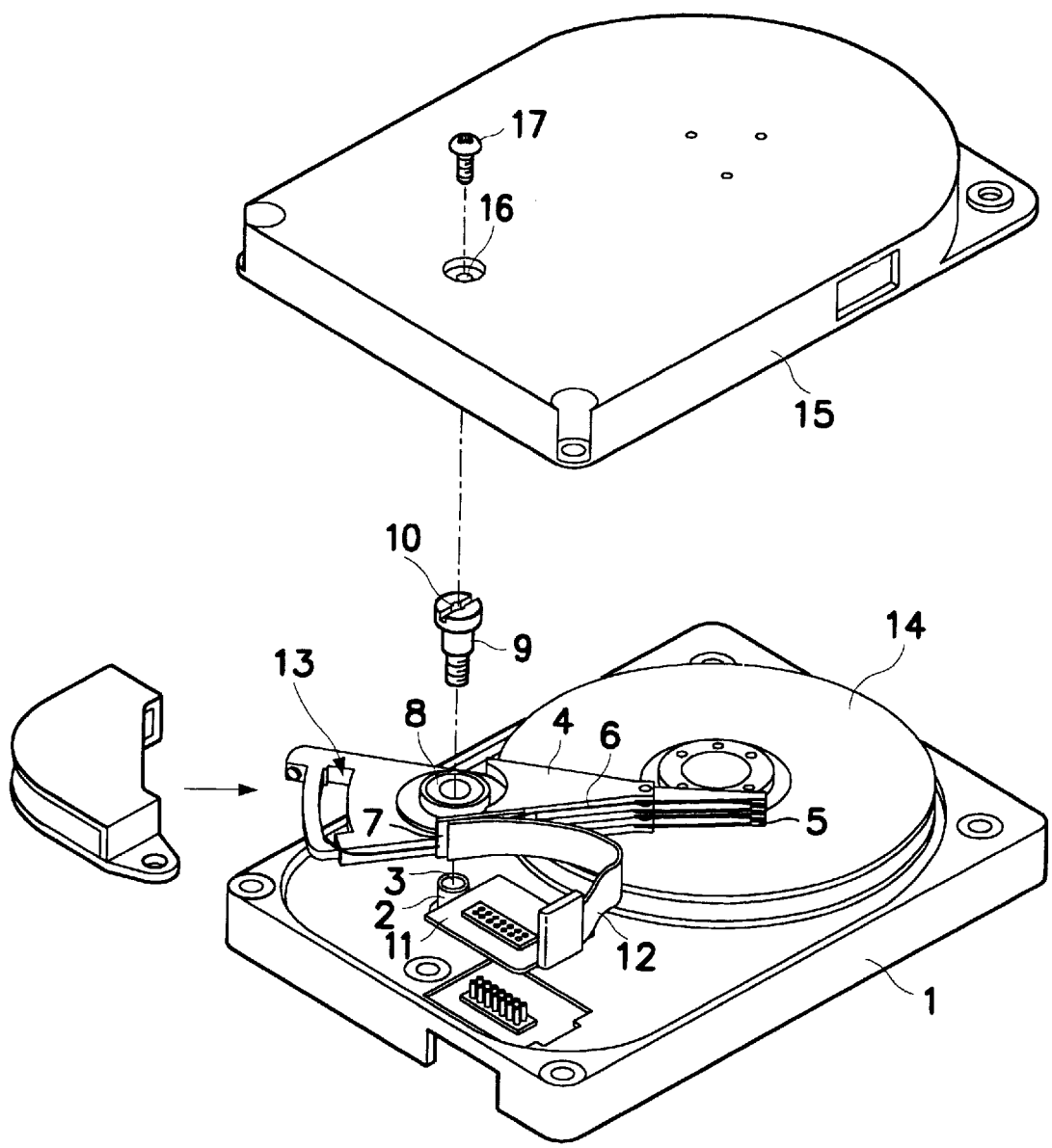
FIG. 1 is an exploded perspective view of an actuator and cover fixing device in a conventional HDD.
Figure 2:
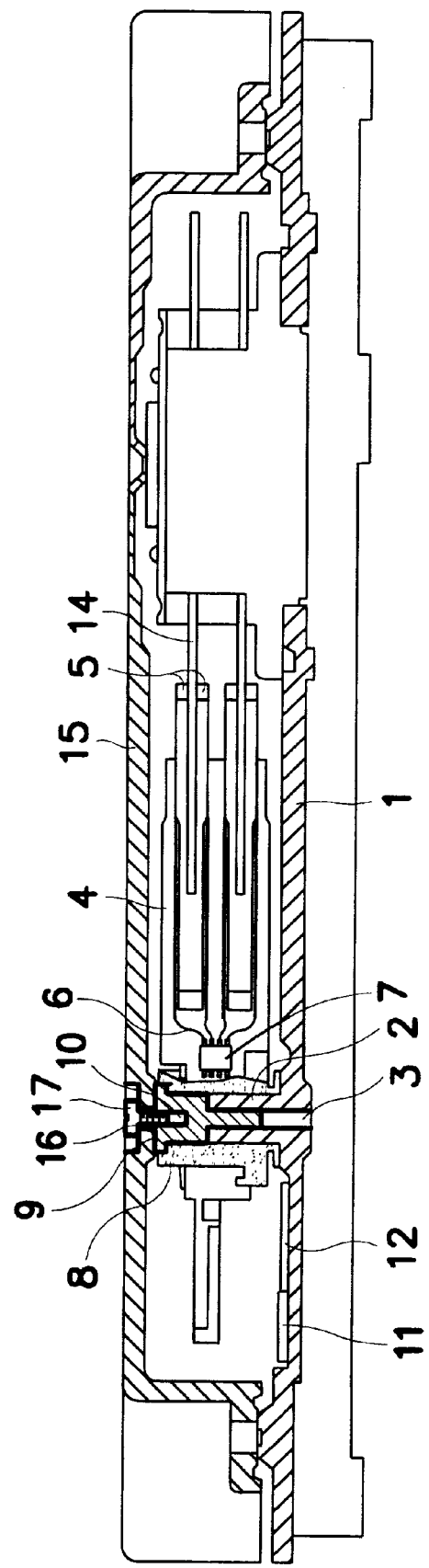
FIG. 2 is a sectional view of an actuator and a cover assembled on a body base in the conventional HDD.

Referring to FIGS. 1 and 2, a pivot bearing 8 installed at the center of an actuator 4 is fit around a boss 2 formed on a body base 1. Then, a pivot screw 9 having a screw hole 10 formed thereon is tightened into a screw hole 3 of the boss 2 so that the actuator 4 can rotate around the boss 2. A head gimbal having a magnetic head 5 fixed thereto is installed at an end of the actuator 4 to write and read data on and from a disk 14 by the magnetic head 5, and a VCM 13 is installed at the other end thereof to rotate the actuator 4 by electromotive force. A preamplifier 7 is fixed to one side surface of the actuator 4. The preamplifier 7 is coupled to the magnetic head 5 by a signal cable 6, to the VCM 13 by a current cable, and to a PCB (Printed Circuit Board) 11 on the body base 1 by an FPC (Flexible Printed Circuit) 12 widely used as a signal transfer means. A cover 15 is fixed to the body base 1 by tightening a pivot mount screw 17 into the screw hole 10 of the pivot screw 9 through a fixing hole 16 formed on the cover 15.

The pivot screw 9 has a threaded portion at the bottom thereof, and the screw hole 10 for receiving the pivot mount screw 17 from the cover 15 and a recess for receiving a flat bladed screw driver on the head thereof. The outer diameter of its body is equal to that of the boss 2 and the head of the pivot screw 9 presses against the upper surface of the pivot bearing 8 when it fixes the actuator 4 through the screw hole 3 of the boss 2.

The screw hole 10 on the head of the pivot screw 9 should be formed to have a depth enough to receive as many as screw threads of the pivot mount screw 17 as possible in view of the length of the pivot mount screw 17 and the thickness of the cover 15.

This pivot screw 9 involves process-related problems. That is, formation of the screw hole 10 makes it difficult to manufacture the pivot screw 9, and foreign materials possibly introduced into the screw hole 10 or metal chips or dust generated from releasing a wrongly tightened pivot mount screw 17 from the screw hole 10 have a deadly influence on drive reliability.

Further, due to a recess on the pivot screw 9 for receiving a flat bladed screw driver different from cross screw driver recesses of other screws, a screw driver tip is likely to slip off and impose an impact on a head and a disk, and force cannot accurately be focused on the center of the pivot screw 9 in fixing the actuator 4. As a result, the HDD can be defective. The different screw driver recesses require use of different screw drivers, which reduces the area of a workroom and adds to HDD assembling steps.

When excess torque is exerted on a screw driver for turning the pivot screw 9, the neck of the pivot screw 9 is susceptible to breakage since the threaded portion is much thinner than the head of the pivot screw 9.

Figure 3:
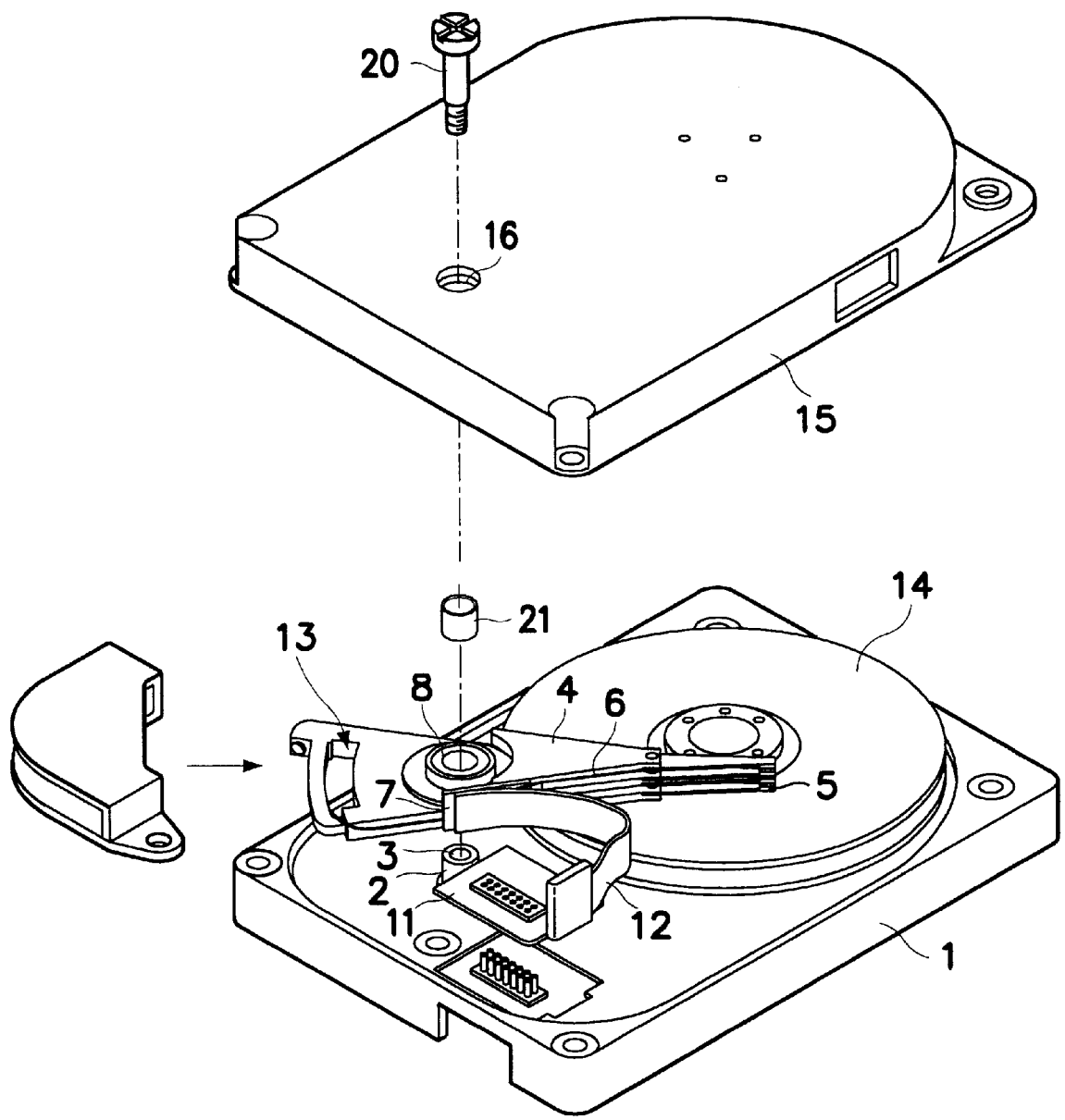
FIG. 3 is an exploded perspective view of an actuator and cover fixing device in an HDD according to an embodiment of the present invention.
Figure 4:
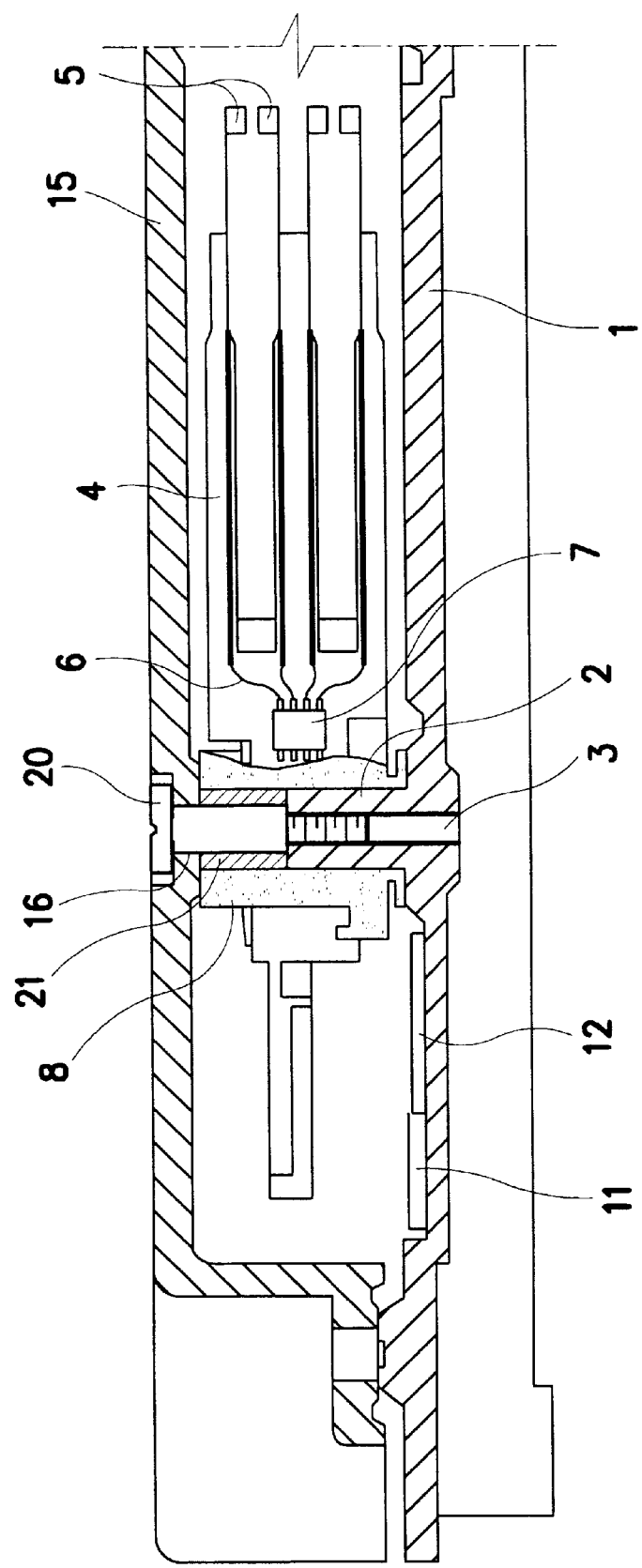
FIG. 4 is a sectional view illustrating a major portion of an actuator and a cover assembled on a body base in the HDD of FIG. 3.

FIG. 3 is an exploded perspective view of an actuator and cover fixing device in an HDD according to an embodiment of the present invention, and FIG. 4 is a sectional view illustrating a major portion of an actuator and a cover assembled on a body base in the HDD. Here, it is to be noted that like reference numerals denote the same components in the drawings.

Referring to FIGS. 3 and 4, a head gimbal having the magnetic head 5 fixed thereto is installed at an end of the actuator 4 to enable the magnetic head 5 to write and read data on and from the disk 14, and the VCM 13 is installed at the other end thereof to rotate the actuator 4 by electromotive force. The preamplifier 7 is fixed to one side surface of the actuator 4. The preamplifier 7 is coupled to the magnetic head 5 by a signal cable 6, to the VCM 13 by a current cable, and to the PCB 11 on the body base 1 by an FPC 12 widely used as a signal transfer means.

The pivot bearing 8 at the center of the actuator 4 is fit around the boss 2 on the body base 1, and a cylindrical ring 21 of a predetermined length is inserted into the pivot bearing 8. The pivot bearing 8 has an outer sleeve received by an opening at the center of the actuator 4 and an inner sleeve fit around the boss 2 on the body base 1 and a cylindrical ring 21 to mount the actuator 4 pivotally on the base 1 through the pivot bearing 8. The height of the cylindrical ring 21 is larger than the thickness of said cylindrical ring 21. Then, the cover 15 is mounted on the body base 1, and a pivot screw 20 is tightened into the screw hole 3 of the boss 2 through a fixing hole 16 formed on the cover 15 and the cylindrical ring 21. Here, the pivot screw 20 has a cross screw driver recess on the head and a threaded portion at the bottom to be inserted into the screw hole 3. Also, the pivot screw 20 has a cylindrical portion received by the cylindrical ring 21 and the fixing hole 16. With this pivot screw 20, the cover 15 and the actuator 4 are concurrently assembled in the HDD in such a manner that the actuator 4 can rotate around the boss 2. In order to assemble precisely and tightly, a height of the boss 2 is smaller than that of the pivot bearing 8, and the cylindrical ring 21 and the boss 2 are engaging the inner sleeve of the pivot bearing 8.

Figure 5:
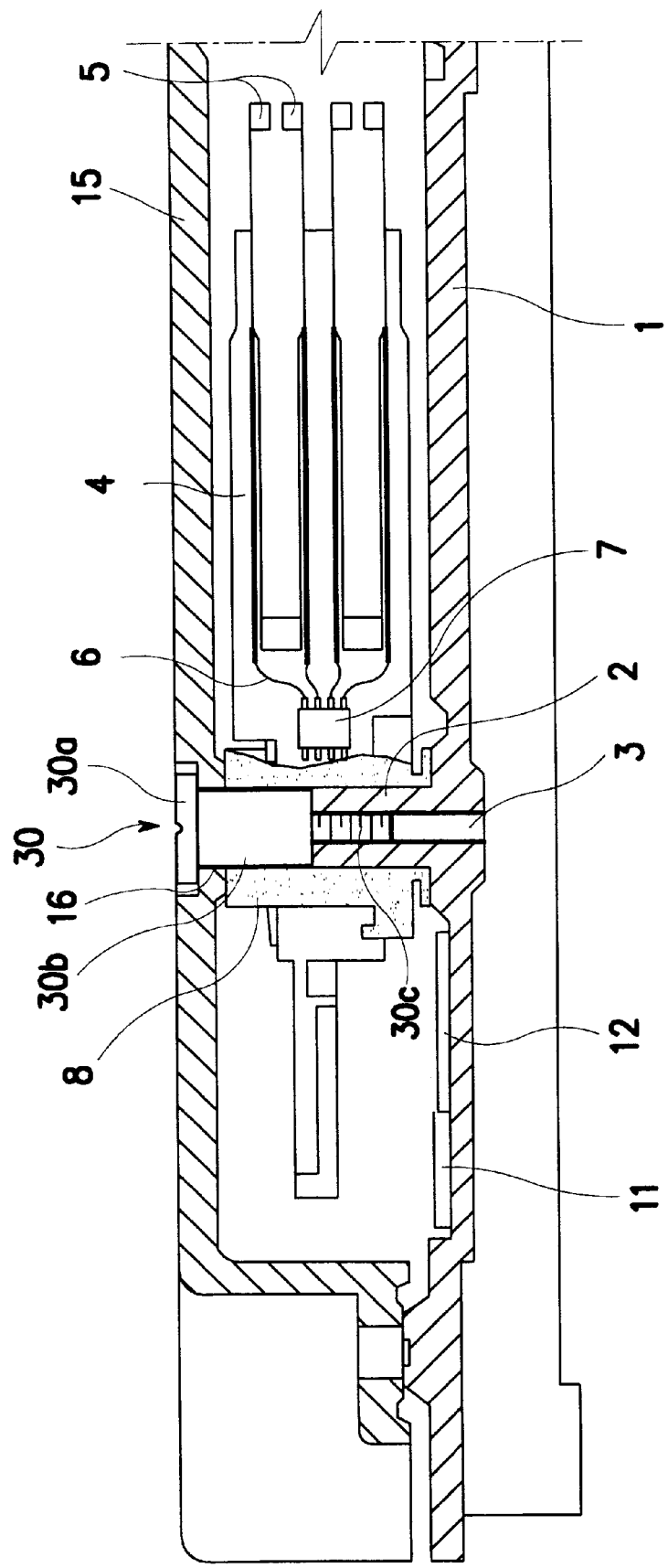
FIG. 5 is a sectional view illustrating a major portion of an actuator and a cover assembled on a body base in an HDD according to another embodiment of the present invention.

FIG. 5 is a sectional view illustrating a major portion of an actuator and a cover assembled on a body base in an HDD according to another embodiment of the present invention.

Referring to FIG. 5, the pivot bearing 8 at the center of the actuator 4 is fit around the boss 2 of the body base 1. Then, a pivot screw 30 is tightened into the screw hole 3 of the boss 2 through the fixing hole 16 formed on the cover 15 and the pivot bearing 8 so that the cover 15 and the actuator 4 are simultaneously fixed on the body base 1.

The pivot screw 30 is comprised of a head 30a, a shaft body 30b, and a threaded bottom 30c. The shaft body 30b of a predetermined length is closely fit into the pivot bearing 8, and the threaded bottom 30c is inserted into the screw hole 3 of the boss 2. The diameter of the shaft body 30b is larger than the threaded bottom 30c. A cross screw driver recess is formed on the head 30a of the pivot screw 30 in order to simultaneously fix the cover 15 and the actuator 4. A bottom side around the fixing hole 16 of the cover 15 is engaging the top of the inside sleeve of the pivot bearing 8 while the shaft body 30b of the pivot screw 30 is engaging a portion of the inside sleeve of the pivot bearing 8 and inner perimeter of the fixing hole 16 of the cover 15.

In a more detailed description of the HDD assembly, the pivot bearing 8 at the center of the actuator 4 is fit around the boss 2 on the body base 1. Then, the cover 15 is mounted on the body base 1 and the pivot screw 30 is inserted into the fixing hole 16 formed on the cover 15. Here, the shaft body 30b of the pivot screw 30 is closely fit into the pivot bearing 8, and the threaded bottom 30c thereof is inserted into the screw hole 3 of the boss 2. Subsequently, the cross screw driver recess on the head 30a of the pivot screw 30 is turned by a screw driver to fix the threaded bottom 30c into the screw hole 3 of the boss 2. Therefore, the cover 15 and the actuator 4 are fixed on the body base 1 by the pivot screw 30 so that the actuator 4 can rotate around the boss 2.

According to the present invention as described above, the actuator and cover fixing device has the following advantages:

(1) Replacement of a pivot screw for fixing the actuator and a screw for fixing the cover with a single integrally formed screw reduces parts and simplifies the assembly process;

(2) Because a relatively strong tightening torque can be exerted on the pivot screw of the present invention due to the cross screw driver recess on its head as compared to the conventional one, the pivot screw is protected from neck breakage and tightened enough. In addition, vibration-induced loosening of the pivot screw can be prevented;

(3) Due to the cross shape of the screw driver recess on the pivot screw, there is a less likelihood of a shock on the head and the disk imposed by slide-off of a screw driver, a flat bladed screw driver is not required, leading to efficient use of a workroom, and a user can focus force on the center of the screw driver recess with a screw driver, thereby preventing assembly failures; and (4) Since a pivot screw is integrally formed with a cover screw, there is no need for forming a screw hole on the pivot screw to fix the cover. Thus, the problems involved in the screw hole are solved: introduction of foreign material into the screw hole, or production of metal chips or dust from the pivot screw when a wrongly tightened cover screw is released. As a result, driver reliability increases.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A device for fixing a cover and an actuator on a base in a hard disk drive, comprising:
    a boss formed on said base and having a screw hole;
    a fixing element formed on said cover, having a fixing hole;
    a pivot bearing assembled in said actuator, having one end contacting said base and the other end contacting said fixing element while inserted around said boss; and
    a pivot screw having a head portion, a cylindrical portion extended from said head portion, and a thread portion extended from said cylindrical portion and tightened into said screw hole while said cylindrical portion is inserted inside of said pivot bearing through said fixing hole.

2. The device of claim 1, said fixing element protruding from said cover toward said base, having a bottom portion formed around said fixing hole and engaged with a top portion of said pivot bearing.

3. The device of claim 1, wherein a diameter of said cylindrical portion is relatively larger than that of said thread portion.

4. The device of claim 1, wherein a diameter of said cylindrical portion is smaller than that of said head portion.

5. The device of claim 1, said fixing element having a bottom portion protruding from a bottom surface of said cover and engaging a top portion of an inner sleeve of said pivot bearing.

6. The device of claim 1, wherein said cover and said bearing are fixed on said base while said pivot screw is inserted into said screw hole through said bearing and said fixing hole.

7. The device of claim 1, wherein said cylindrical portion of said pivot screw is inserted inside of said pivot bearing through said one end of said pivot bearing while said boss of said base is inserted inside of said pivot bearing through said other end of said pivot bearing.

8. The device of claim 1, wherein said screw hole is penetrating through said base.

9. A device for fixing a cover and an actuator on a base in a hard disk drive, comprising:
    a boss formed on said base and having a screw hole;
    a fixing element formed on said cover, having a fixing hole formed on said fixing element;
    a pivot bearing assembled in said actuator, having one end contacting said base and the other end contacting said fixing element while one portion of said pivot bearing is inserted around said boss;
    a cylindrical ring inserted inside of the other portion of said pivot bearing while said boss is inserted inside of said one portion of said pivot bearing, contacting both said boss and said fixing element;
    a pivot screw tightened into said screw hole through said fixing hole and said cylindrical ring.

10. The device of claim 9, said fixing element having a protruding portion formed around said fixing hole, said protruding portion engaging said cylindrical ring.

11. The device of claim 10, said protruding portion engaging said pivot bearing.

12. The device of claim 9, said fixing element having a protruding portion engaging both said pivot bearing and said cylindrical ring.

13. The device of claim 9, wherein said pivot screw includes a head portion, a cylindrical portion fit inside of said cylindrical ring and thread portion tightened into said screw hole.

14. The device of claim 9, wherein said cylindrical ring is inserted between inside of said bearing and perimetric outside of said cylindrical portion of said pivot screw.

15. A device for fixing a cover and an actuator on a base in a hard disk drive, comprising:
    a boss formed on said base, having a screw hole;
    a fixing element formed on said cover, having a fixing hole;
    a pivot bearing assembled in said actuator, having a bore inserted around said boss, engaged with both said fixing element and said base while said boss is inserted into said bore of said pivot bearing; and
    a pivot screw tightened into said screw hole of said base while inserted through said fixing hole and said bore.

16. The device of claim 15, said fixing element protruding from a surface of said cover toward said base, contacting one end of said pivot bearing.

17. The device of claim 15, said pivot screw having a head portion, a cylindrical portion extended from said head portion and inserted into one end of said bore of said pivot bearing while said boss is inserted into the other end of said bore of said pivot bearing, and a thread portion extended from said cylindrical portion and tightened into said screw hole.

18. The device of claim 17, said cylindrical portion of said pivot screw contacting said boss of said cover within said bore of said pivot bearing.

19. The device of claim 15, said pivot bearing having an inner sleeve contacting said fixing element of said cover, a circumferential surface of said boss, a flat surface of said base.

20. The device of claim 15, further comprising a cylindrical ring inserted between said bore and said pivot screw, contacting both one end of said boss and said fixing element.

* * * * *